United States Patent [19]
Akita

[11] 4,386,386
[45] May 31, 1983

[54] CAPACITOR TYPE SENSOR FOR DETECTING DISPLACEMENT OR LOAD

[75] Inventor: Sigeyuki Akita, Okazaki, Japan
[73] Assignee: Nippon Soken, Inc., Nishio, Japan
[21] Appl. No.: 255,273
[22] Filed: Apr. 17, 1981
[30] Foreign Application Priority Data Apr. 22, 1980 [JP] Japan .............................. 55-55789[U]
Apr. 22, 1980 [JP] Japan .............................. 55-55790[U]

[51] Int. Cl.³ .............................................. H01G 7/00
[52] U.S. Cl. .................................. 361/283; 73/862.64;
361/278; 361/290; 361/291; 361/400
[58] Field of Search ................ 361/291, 292, 290, 278,
361/283, 400; 73/862.64

[56] References Cited
U.S. PATENT DOCUMENTS 1,740,159 12/1929 Dublier ................................. 361/290
1,871,048 8/1932 Dublier ................................. 361/291
3,703,300 11/1972 Gillund ............................ 361/283 X

FOREIGN PATENT DOCUMENTS 207649 12/1923 United Kingdom ............... 361/278

Primary Examiner—Elliot A. Goldberg
Attorney, Agent, or Firm—Cushman, Darby & Cushman

[57] ABSTRACT

A capacitor type displacement or load sensor includes a first electrode constituted by an electrically conductive coiled spring capable of expansion and contraction and a second electrode positioned to face the first electrode without making contact therewith. The second electrode is constituted by an electrically conductive coiled spring or a cylindrical electric conductor. The sensor is constructed such that capacitance between the first and second electrodes varies with a change of a gap between the first and second electrodes or an opposing area of the first and second electrodes caused by the relative displacement occurring therebetween.

7 Claims, 5 Drawing Figures

CAPACITOR TYPE SENSOR FOR DETECTING DISPLACEMENT OR LOAD

BACKGROUND OF THE INVENTION

The present invention relates to a capacitor type sensor for detecting the displacement of an object as a change in capacitance, and it is useful for measuring the amount of displacement of an object or the magnitude of load on the object.

SUMMARY OF THE INVENTION

It is an object of the present invention to provide a sensor in which at least one of two electrodes is in the form of a coiled spring, so that any displacement or load applied externally to the coiled spring can be detected as a capacitance change, thereby making the sensor small and compact and making it possible to attain accurate detection of the displacement or load.

The other objects, features and advantages of the present invention will be apparent from the following descriptions taken in conjunction with the accompanying drawings.

DESCRIPTION OF THE PREFERRED EMBODIMENTS

Figure 1:
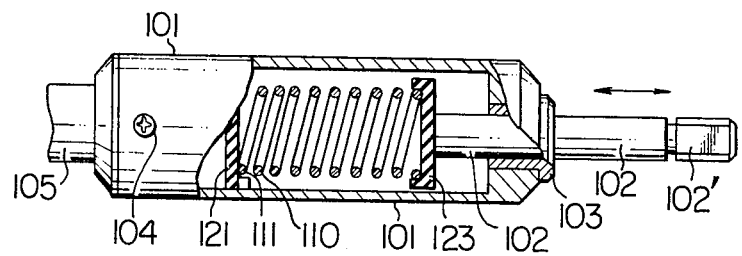
FIG. 1 is a partially cutaway view showing, by way of example, a sensor having the electrode structure according to a first embodiment of this invention for detecting the displacement of an object.

Preferred embodiments of the present invention will now be described in greater detail with reference to the accompanyings drawings. In the accompanying drawings, like reference numerals refer to like parts.

Figure 2A:
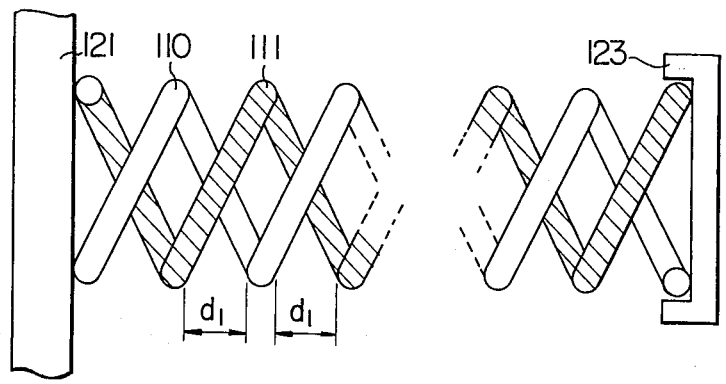
FIGS. 2A and 2B are respectively explanatory drawings showing the construction and operation of the electrode structure according to the first embodiment of the invention.
Figure 2B:
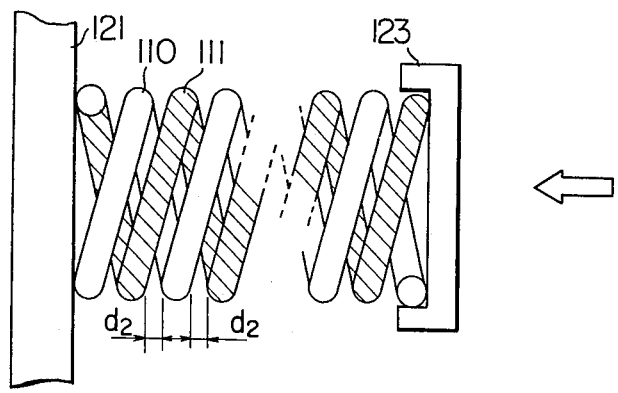
Figure 4:
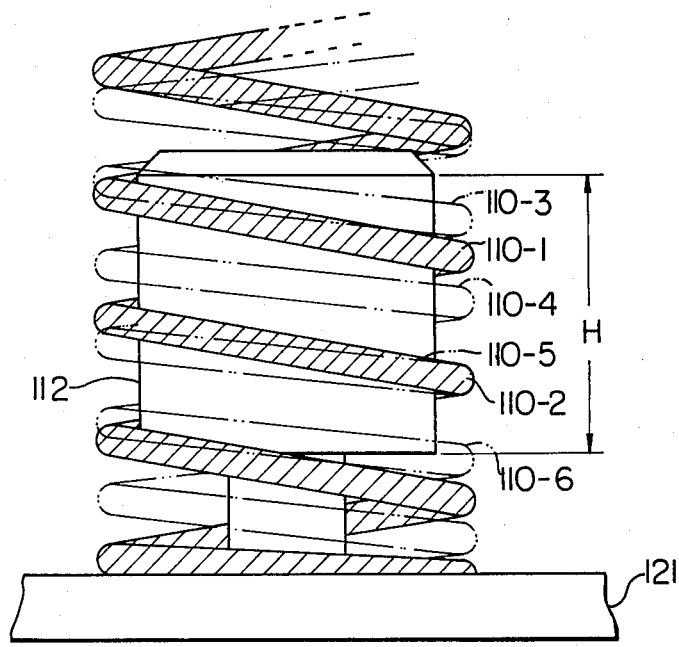
FIG. 4 is an explanatory drawing showing the construction and operation of the electrode structure according to the second embodiment of the invention.

Further, it should be noted that the hatching applied to a coiled electrode is intended to clearly illustrate the separation between the first and second coiled electrodes 110 and 111 in FIGS. 2A and 2B and the separation between two states of one and the same movable electrode 110 in FIG. 4.

Referring to FIG. 1 and FIGS. 2A and 2B, there is illustrated a sensor according to a first embodiment of this invention whose electrodes are constituted at least by two coiled springs and any displacement or load applied externally to the coiled springs is detected as a capacitance change.

FIG. 1 shows the overall construction of a displacement sensor having the electrode structure according to the first embodiment of the invention. In the Figure, numeral 101 designates a housing attached to a fixed body which is not shown. Numeral 102 designates a shaft having a threaded portion 102' at its outer end and attached by the threaded portion to an object which is movable relative to the fixed body, thus allowing the shaft 102 to move in the directions of the arrows shown in FIG. 1 in response to the displacement of the object. Numeral 103 designates a bearing made of an oilless metal or other bearing members which allows smooth displacement of the shaft 102. Numeral 104 designates housing fastening screws, and 105 an outlet through which are led out the power supply line and the signal output line for an electric circuitry (housed in the left side portion of the housing 101) which electrically processes the capacitance varying in response to the displacement of the object.

Numeral 110 designates a first coiled electrode constituted by a coiled spring made of a suitable conductive material such as phosphor bronze and having a uniform winding pitch. One end of the first coiled electrode 110 is electrically connected and fixed by soldering to a first conductor printed on a printed circuit board 121 secured to the housing 101 and is then connected electrically to the electric circuitry housed in the housing 101. The other end of the electrode 110 is secured to an insulator member 123 which is fixed to the inner end of the shaft 102.

Numeral 111 designates a second coiled electrode constituted by a coiled spring made of a suitable conductive material such as phosphor bronze and having the same uniform winding pitch, winding diameter and winding direction as the first coiled electrode 110. One end of the second coiled electrode 111 is electrically connected and fixed by soldering to a second conductor printed on the printed circuit board 121 and is then connected electrically to the electric circuitry housed in the housing 101. The other end of the electrode 111 is secured to the insulator member 123, thus being made movable in the same manner as the first coiled electrode 110.

With the construction described above, when the shaft 102 is caused to move with the displacement of the object, the first and second coiled electrodes 110 and 111 are simultaneously caused to expand or contract.

The operation of the first and second coiled electrodes 110 and 111 according to the first embodiment of this invention will now be described with reference to FIGS. 2A and 2B.

Let it be assumed that when the shaft 102 is at the position shown in FIG. 1, the first coiled electrode 110 and the second coiled electrode 111 are spaced opposite to each other at a distance $d_1$ as shown in FIG. 2A. When the shaft 102 is caused to move by the object (when the shaft 102 is moved to the left in FIG. 1) so that both coiled electrodes 110 and 111 contract as shown in FIG. 2B, the first and second coiled electrodes 110 and 111 are now spaced opposite to each other at a distance $d_2$ which is smaller than the former distance $d_1$. Since the capacitance changes in accordance with a change in the distance between the electrodes, the capacitance varies in accordance with the displacement or load applied externally to the coiled springs.

Thus, by detecting the capacitance change by the electric processing circuit which is not shown (e.g., by measuring a time for charging or discharging the capacitor formed by both coiled electrodes 110 and 112 or by measuring a frequency change in a CR oscillator circuit using the capacitance between the first and second coiled electrodes 110 and 111), it is possible to measure displacement or load applied externally to the coiled springs. In this case, capacitance changes to the extent of 2 to 5 picofarads (pF) at least will serve the purpose.

Of course, greater the capacitance changes, better will be the results.

While, in the above-described embodiment, both coiled electrodes are identical in the winding diameter and winding direction (in the number of turns as well) the winding diameters of both coiled electrodes may be different from each other.

Further, both coiled electrodes may be made different in the winding diameter from each other and opposite in the winding direction to each other. Also, the coiled electrodes may be formed into any shape other than the circular shape. In addition, as referred to in the first embodiment, in order to increase the capacitance and the magnitude of its change, a substance of a large dielectric constant such as insulating oil may be sealed in the space in which the first and second coiled electrodes are disposed. Further, a coating of an insulating material such as insulating enamel may be applied to at least one of the first and second coiled electrodes.

Figure 3:
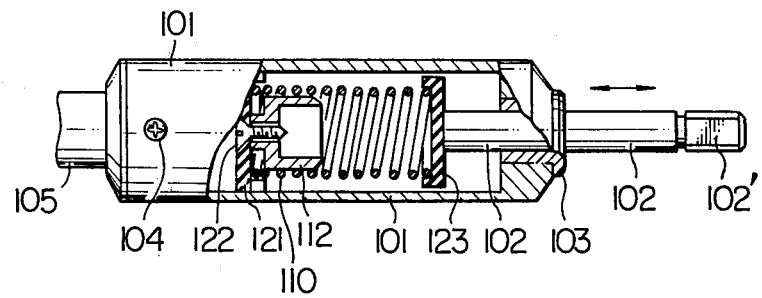
FIG. 3 is a partially cutaway view showing, by way of example, a sensor having the electrode structure according to the second embodiment of this invention for detecting the displacement of an object.

Referring to FIGS. 3 and 4, there is illustrated a second embodiment of this invention in the form of a sensor comprising a first electrode constituted by a conductive coiled spring capable of expansion and contraction and a second fixed electrode positioned inside or outside the first electrode and opposite thereto, with the effective length of the second electrode in the expansion or contraction direction of the first electrode being made shorter than the minimum length of the first electrode.

FIG. 3 shows the overall construction of a displacement sensor having the electrode structure according to the above-mentioned second embodiment of this invention. In the Figure, numeral 101 designates a housing attached to a fixed body which is not shown. Numeral 102 designates a shaft having a threaded portion 102' at its outer end and secured by the threaded portion 102' to an object whcih is movable relative to the fixed body, thus allowing the shaft 102 to move in the directions of the arrows shown in FIG. 3 in response to the displacement of the object. Numeral 103 designates a bearing made of an oilless metal or other bearing members which allows smooth displacement of the shaft 102. Numeral 104 designates housing fixing screws, and 105 an outlet through which are led out the power supply line and the signal output line for an electric circuitry (housed in the left side portion of the housing 101) which electrically processes the capacitance varying in response to the displacement of the object.

Numeral 112 designates a cylindrical fixed electrode (a second electrode) which is fastened to a printed circuit board 121 by a screw 122. The cylindrical fixed electrode 112 is electrically connected to a first conductor printed on the printed circuit board 121, and the first conductor is connected to the electric circuitry.

Numeral 110 designates a movable electrode (a first electrode) constituted by a conductive coiled spring made of a suitable conductive material such as phosphor bronze and concentrically positioned at the outer side of the cylindrical fixed electrode 112 with a predetermined gap left therebetween. One end of the movable electrode 110 is electrically connected by soldering to a second conductor printed on the printed circuit board 121 and is then connected electrically to the electric circuitry part. The other end of the movable electrode 110 is secured to an insulator member 123 which is fixed to the inner end of the shaft 102.

With the construction described above, when the shaft 102 is caused to move in response to the displacement of the object, the movable electrode 110 is caused to expand or contract with the movement of the shaft 102.

Next, the relative operation of the fixed electrode 112 and the movable electrode 110 in the second embodiment of this invention will be described with reference to FIG. 4.

Assuming that when the shaft 102 is at the position shown in FIG. 3, the movable electrode 110 is held opposite to the fixed electrode 112 as shown by the solid lines in FIG. 4. In this case, there are included two turns 110-1 and 110-2 of the movable electrode 110 within the length H of the fixed electrode 112. Thus, the capacitance is imparted by the fixed electrode 112 and the opposing two movable electrode turns 110-1 and 110-2.

Then, when the shaft 102 is moved thereby to cause the movable electrode 110 to contract (namely, when the shaft 102 is moved to the left in FIG. 3), the movable electrode 110 is deformed as shown by the two-dot chain lines in FIG. 3. In this case, observation of the number of the movable electrode turns facing the fixed electrode 112 reveals that four turns 110-3, 110-4, 110-5 and 110-6 are now involved as shown by the two-dot chain lines in FIG. 4. As a result, the capacitance is given by the fixed electrode 112 and the opposing four turns of the movable electrode 110, and this capacitance becomes eventually greater than that given by the two turns of the movable electrode 110. Thus it will be evident that the capacitance varies in dependence on the number of turns of the movable electrode 110 facing the fixed electrode 112.

In this way, since the capacitance varies with the displacement of the object, electrical detection of the capacitance change by an electric processing circuit which is not shown (e.g., by measuring the charging or discharging time of a capacitor or by measuring a change of the oscillation frequency of a CR oscillator circuit) makes it possible to measure displacement of the object. In this case, capacitance changes to the extent of 2 to 5 picofarads (pF) at least will serve the purpose.

While, in the above-described second embodiment, the movable electrode 110 is positioned at the outer side of the fixed electrode 112, the movable electrode 110 may be positioned inside a hollow cylindrical fixed electrode. Of course, two movable electrodes may be used, one at the inner side and the other at the outer side of the fixed electrode 112. Further, while, in the second embodiment, both of the fixed and movable electrodes are formed to have a circular shape, the invention is not intended to be limited thereto.

Further, it is needless to say that if the fixed electrode 112 is secured to the insulator member 123 instead of the housing 101, the number of turns of the coiled spring facing the fixed electrode 112 still varies with the quantity to be detected, so that this arrangement may be used as a modification of this invention.

Further, it is possible to design such that the length of the fixed electrode 112 or its position relative to the movable electrode 110 may be suitably changed for the purpose of adjustment.

Further, it is, of course, possible to utilize either the expanding or contracting action for the displacement of the coiled spring constituting the movable electrode 110.

Further, an insulating spacer may be inserted between the fixed electrode 112 and the movable electrode 110 to maintain a gap therebetween or to prevent them from contacting each other. Further, as in the case of the first embodiment, an insulating coating such as an insulating enamel coating may be applied to the movable electrode 110, and further a material having a large dielectric constant may be sealed in the space in which both electrodes are disposed.

Further, instead of providing a uniform pitch between the respective turns of the coiled spring constituting the movable electrode 110 (as in the case of the first embodiment), any arbitrary pitch may be adopted to enable the detection of a signal showing a specific function with respect to the displacement.

It will thus be seen from the foregoing that in accordance with the sensor of this invention, by virtue of the fact that the capacitance between at least two electrodes is varied by the expansion or contraction of a coiled spring constituting at least one of the electrodes in response to any displacement or load externally applied thereto, thus making it possible to detect the capacitance and the quantity of its change, there is obtained a great advantage such that the sensor is made small and compact and also made capable of effecting accurate detection of any displacement or load.

An example of the useful and effective applications of the sensor according to the invention is the use of the sensor for detecting the position of an accelerator pedal of a vehicle on which an internal combustion engine has been mounted.

I claim:

1. A capacitor type displacement or load sensor comprising:
   a first electrode constituted by an electrically conductive coiled spring capable of expansion and contraction, said first electrode having one end thereof connected to a first conductor disposed on a fixed insulating member of said sensor and the other end thereof connected to a movable insulating member of said sensor; and
   a second electrode connected at one end thereof to a second conductor disposed on said fixed insulating member of said sensor and positioned opposite to said first electrode without contacting the same;
   whereby capacitance between said first and second electrodes varies in response to the expansion or contraction of said electrically conductive coiled spring, and
   wherein said second electrode in constituted also by an electrically conductive coiled spring capable of expansion and contraction,
   said second electrode having one end thereof connected to said second conductor on said fixed insulating member of said sensor and the other end thereof connected to said movable insulating member of said sensor, and
   both electrically conductive coiled springs of said first electrode and said second electrode are combined to form a double coil spring without making contact with each other, whereby capacitance between said first and second electrodes varies with a change of an axial gap between both electrically conductive coiled springs.

2. A sensor according to claim 1, wherein said sensor further comprises a housing for accommodating said first and second electrodes, and said movable insulating member of said sensor is supported by said housing and coupled to an external object to be measured.

3. A sensor according to claim 1, wherein said sensor further comprises a built-in printed circuit board, and said first and second conductors disposed on said fixed insulating member of said sensor are mounted on said printed circuit board.

4. A capacitor type displacement or load sensor comprising:
   a movable electrode constituted by an electrically conductive coiled spring capable of expansion and contraction;
   a cup-shaped fixed electrode;
   a fixed insulating member mounting first and second conductors to which one end of said movable electrode and that of said fixed electrode are connected respectively;
   a movable spring holding insulating member supporting the other end of said conductive coiled spring constituting said movable electrode;
   a housing accommodating said movable electrode, said fixed electrode, said fixed insulating member and said movable spring holding insulating member; and
   a rod member slidably supported by said housing and having one end thereof coupled to said movable spring holding insulating member and the other end thereof extended outside said housing;
   wherein said cup-shaped fixed electrode is positioned inside said movable electrode without contacting the same, and an effective length of said cup-shaped fixed electrode in the direction of expansion or contraction of said movable electrode is made shorter than a minimum length of said movable electrode in the same direction, whereby capacitance between said cup-shaped fixed electrode and said movable electrode varies with a change of an opposing area of said cup-shaped fixed electrode and said movable electrode.

5. A sensor according to claim 4, wherein said cup-shaped fixed electrode has a cup portion having a cylindrical external shape and a boss portion extending outwardly from a central portion of said cup portion, concentrically with said cylindrical external shape and with an outer diameter smaller than that of said cylindrical external shape of said cup portion.

6. A capacitor type displacement or load sensor comprising:
   a first movable electrode constituted by an electrically conductive coiled spring capable of expansion and contraction;
   a second movable electrode constituted by an electrically conductive coiled spring capable of expansion and contraction and combined with said first movable electrode to form a double coil spring without making contact therewith;
   a fixed insulating member mounting first and second conductors to which one end of said first movable electrode and that of said second movable electrode are connected respectively;
   a movable spring holding insulating member supporting the other ends of said first and second movable electrodes, respectively;
   a housing accommodating said first and second movable electrodes, said fixed insulating member and said movable spring holding insulating member; and
   a rod member slidably supported by said housing and having one end thereof coupled to said movable spring holding insulating member and the other end thereof extended outside said housing;
   whereby capacitance between said first and second movable electrodes varies in response to the expansion and contraction of said electrically conductive coiled springs.

7. A capacitor type displacement or load sensor comprising:
- a first electrode constituted by an electrically conductive coiled spring capable of expansion and contraction, said first electrode having one end thereof connected to a first conductor disposed on a fixed insulating member of said sensor and the other end thereof connected to a movable insulating member of said sensor; and
- a second electrode connected at one end thereof to a second conductor disposed on said fixed insulating member of said sensor and positioned opposite to said first electrode without contacting the same;
- whereby capacitance between said first and second electrodes varies in response to the expansion or contraction of said electrically conductive coiled spring, and
- wherein said sensor further comprises a built-in printed circuit board, and said first and second conductors disposed on said fixed insulating member of said sensor are mounted on said printed circuit board.

* * * * *